F. E. WILCOX.
VEHICLE GEAR.
APPLICATION FILED FEB. 20, 1914.
1,122,452.
Patented Dec. 29, 1914.
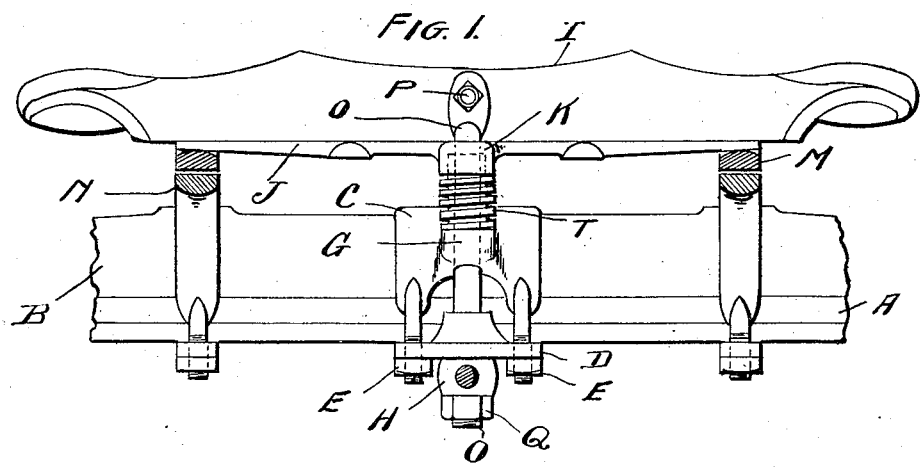
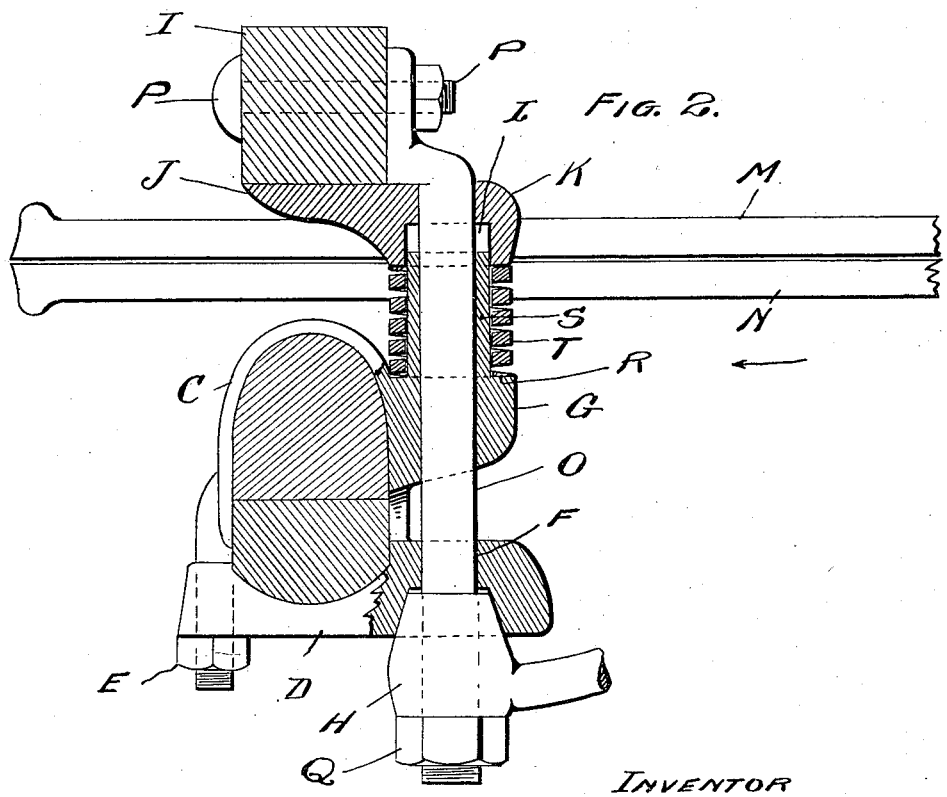
WITNESSES.
C. K. Davies.
C. E. Vogel
INVENTOR
F. E. Wilcox,
By F. E. Stebbins,
Attorney.

UNITED STATES PATENT OFFICE.

FRANK E. WILCOX, OF MECHANICSBURG, PENNSYLVANIA.

VEHICLE-GEAR.

1,122,452. Specification of Letters Patent. Patented Dec. 29, 1914.

Application filed February 20, 1914. Serial No. 819,993.

*To all whom it may concern:*

Be it known that I, FRANK E. WILCOX, a citizen of the United States, residing at Mechanicsburg, in the county of Cumberland and State of Pennsylvania, have invented certain new and useful Improvements in Vehicle-Gears, of which the following is a specification.

The main object of my invention is the provision, in connection with a vehicle having a king bolt and upper and lower fifth wheel members or bearings, one member adapted to move relative to the other in the arc of a circle when the front wheels and axle are turned, of yielding or spring means for supporting the part of the vehicle to which the upper fifth wheel member or bearings may be attached so that the said upper member or bearings will, under normal conditions, be out of contact with the lower fifth wheel member or bearings, or, if in contact therewith, transmit to said lower member or bearings a fractional part only of the weight of the superimposed load, as of the body and the occupants of the vehicle.

A further object is the provision, in connection with a vehicle gear provided with a head block plate having a perforated lug, upper and lower fifth wheel members located between the head block plate and axle or axle bed, a king bolt clip with a perforated head and a king bolt, of yielding or spring means for raising the head block plate and upper member of the fifth wheel so the frictional contact of the fifth wheel members will not be excessive, and so, when desired, the superimposed weight may be supported by the head of the king bolt clip. In use the excessive frictional contact of the fifth wheel members prevents the easy turning of one member relative to the other, and my invention is designed to obviate this objectionable feature of operation by wholly or partially supporting the weight upon a spring, preferably one in connection with the head of the king bolt clip. Furthermore, the presence of spring supporting means between the axle and head block or the body provides an easier riding vehicle, prevents the transmission of vibrations to the body and parts above the axle and diminishes the wear upon the parts of the gear which otherwise would be in frictional contact.

With these ends in view, my invention consists in certain novelties of construction and combinations of parts as herein set forth and claimed.

The accompanying drawing illustrates an example of the embodiment of the invention, the spring being combined with the head of the king bolt clip and the head block plate lug according to one of the best modes of procedure I have so far devised for the purpose, though the spring may be differently located.

Figure 1 is a view in elevation of the entire gear, the fifth wheel members being in section, as seen when looking in the direction of the arrow, Fig. 2. Fig. 2 is a section of a vehicle gear on a vertical plane adjacent to the king bolt, showing the preferred embodiment of the invention.

Referring to the figures, the letter A designates the axle; B, the axle bed; C, an integral three pronged king bolt clip; D, the axle clip yoke; E, the nuts on the threaded prongs; F, a hole in the yoke for the king bolt; G, the perforated head of the king bolt clip; H, the perforated brace head; I, the head block; J, the head block plate; K, the perforated lug of the plate; L, a recess at the under surface of the lug; M, the upper member of the fifth wheel secured to the head block plate; N, the lower member of the fifth wheel secured to the axle bed and axle; O, the king bolt; P, a bolt which secures the top end of the king bolt to the head block; and Q is a nut at the lower end of the king bolt.

The perforated head of the clip G is provided with a bearing surface R and a hollow cylindrical extension S, the upper end of which extension is located and movable within the recess L of the head block plate lug. The king bolt O passes through all the perforated elements, as shown. A helical spring T surrounds the extension S and the king bolt and its ends engage the bearing surface R and the under surface of the head block plate, as illustrated. The spring has sufficient capacity that, when compressed by turning the nut Q and drawing down the king bolt, head block and head block plate to the relative positions, as shown by the drawing, the spring will be under compression; for example, two hundred pounds, more or less, and, when so compressed, the upper and lower fifth wheel members will be slightly separated or in slight frictional contact and relieved of the major part of the load.

The invention embodied as shown constitutes a very desirable improvement, inasmuch as it prevents the excessive wear of the fifth wheel members, lessens the strains upon the different parts of the gear so they are less liable to become distorted or broken, and greatly improves the riding quality of the vehicle by preventing the transmission of vibrations to the body.

While there is shown and described one example of the embodiment of the invention, the principle may be applied by other modes, which will be included within the scope of the claims and thus not constitute substantial departures.

It should be understood that in the preferable combination of the parts the spring holds the fifth wheel members or bearings slightly separated so that the weight will be taken by the spring, but the invention will be embodied when the members of the fifth wheel or bearings are slightly in contact and take part of the load, the remaining part being taken by the spring.

What I claim is:

1. The combination of a king bolt clip having a perforated head, a head block plate with a perforation, a king bolt, side bearings, and spring means located between the said perforated head and head block plate for supporting the major portion of the weight of the head block plate and the parts above the same and preventing excessive frictional contact of the side bearings.

2. The combination of a head block plate having a lug at the rear edge, a bearing in connection with and at the rear of the axle, and spring means between the said plate and said bearing for supporting the plate and the parts above the same; a king bolt and nut being provided for regulating the compression of the spring, said king bolt being located at the rear of the axle.

3. The combination of a head block having a bearing element, an axle provided with a bearing element, a king bolt and nut, a spring between said bearing elements, and side bearings located at opposite sides of the king bolt, the spring being subject to compression by turning the nut on the king bolt so as to bring the side bearings into slight frictional contact, and the king bolt uniting the axle and the part of the gear above the axle and serving as a pivotal guide when the axle and wheels are turned.

4. The combination of a head block having a bearing element, an axle provided with a bearing element, means for loosely interlocking the axle and head block to hold them in their normal relative positions, a king bolt and nut, pairs of side bearings at opposite sides of the king bolt supported by the axle and head block, and a spring between said bearing elements, and independent of the pairs of side bearings.

5. The combination of a head block plate, an axle clip, a spring between the said plate and axle clip, upper and lower fifth wheel members, and a king bolt provided with means for adjusting the same relative to the axle clip and compressing the spring and drawing the fifth wheel members toward each other.

6. The combination of a perforated head block plate lug with a recess, an axle clip with a perforated extension having its end movably located within the recess of the head block plate lug, a perforated axle yoke, a threaded king bolt within the perforations of the said lug, extension and yoke, and a helical spring surrounding the extension and king bolt and adapted to be compressed by means, as a nut, on the king bolt.

7. The combination with a vehicle gear having a king bolt and fifth wheel members, of a helical spring surrounding the king bolt and adapted to support the main part of the weight of the vehicle above the axle and relieve the excessive frictional pressure between the fifth wheel members.

8. The combination with a vehicle gear having fifth wheel members or side bearings and a king bolt and nut, of a helical spring located between the upper and lower parts of the gear and intermediate the bearings, the said spring being adapted to be held under compression by the king bolt and nut and to relieve the fifth wheel members or side bearings from excessive frictional contact.

In testimony whereof I affix my signature in presence of two witnesses.

FRANK E. WILCOX.

Witnesses:
J. E. HOERNER,
M. E. ANDERSON.

Copies of this patent may be obtained for five cents each, by addressing the "Commissioner of Patents, Washington, D. C."